Sept. 4, 1962 T. K. PETERSEN 3,052,483
AIR FILM SUPPORTED LOAD CARRIER
Filed March 8, 1961 2 Sheets-Sheet 1

INVENTOR.
THORVALD K. PETERSEN
BY
Edwin Coates
ATTORNEY.

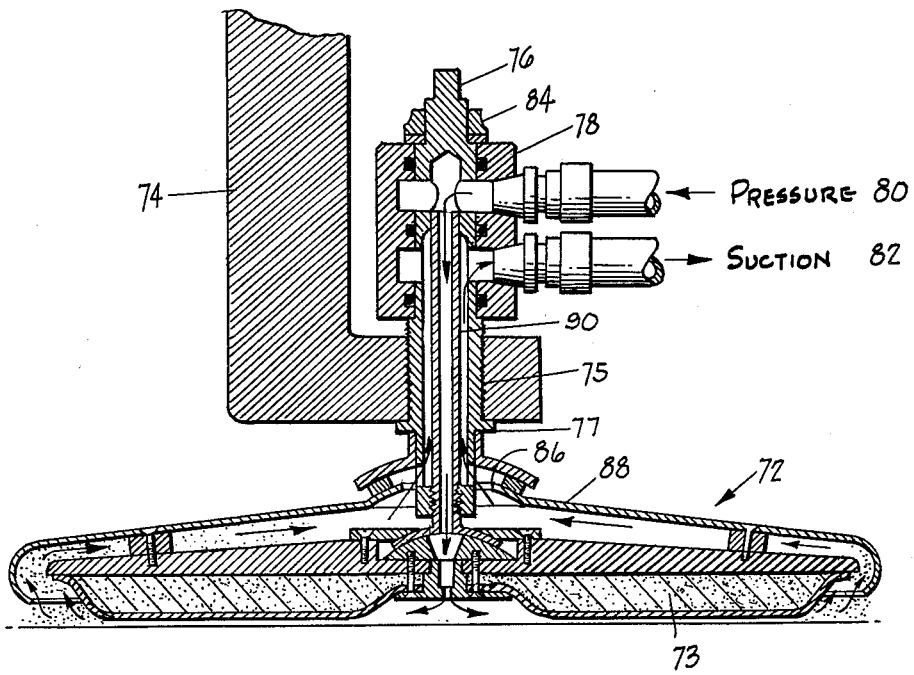
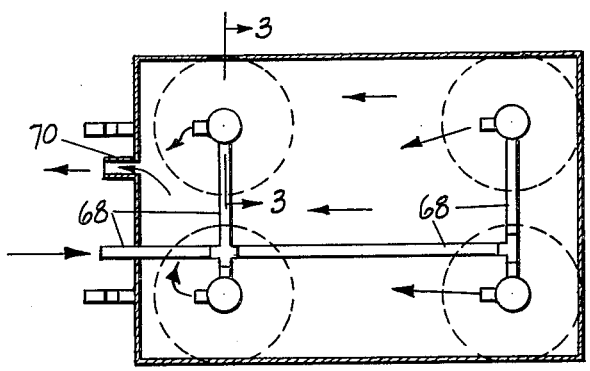

United States Patent Office 3,052,483
Patented Sept. 4, 1962

3,052,483
AIR FILM SUPPORTED LOAD CARRIER
Thorvald K. Petersen, Santa Monica, Calif., assignor to Douglas Aircraft Company, Inc., Santa Monica, Calif.
Filed Mar. 8, 1961, Ser. No. 94,176
4 Claims. (Cl. 280—28.5)

This invention relates to an improved load carrying device, such as a pallet, of the type which utilizes a thin film of pressurized air for reducing the coefficient of friction between it and the ground plane, thereby facilitating its movement along the ground plane.

Load carrying devices of this general type have been previously described in U.S. Patent No. 2,918,183 issued on December 22, 1959, to T. K. Petersen and P. L. Smith. The present invention deals with an improved type of device which utilizes a swivel-jointed foot or ground engaging unit which is better able to cope with undulations and slight protuberances in the ground plane than the previous devices. Moreover, the present devices are equipped with dust removal units which will take care of any dust which might be raised by the pressurized air used to buoy the pallets off the ground plane. The problem of dust may be particularly acute in such places as flour mills, foundries, rubber mills, and the like.

The various features of the improved device of the present application will be better understood by referring to the accompanying drawings in which:

FIGURE 3 is a sectional elevational view of a ground engaging unit taken along the line 3—3 in FIG. 2; and FIGURE 4 is a sectional elevational view of a foot which can be used in conjunction with a fixed load such as a machine which requires frequent movement.

Figure 1:
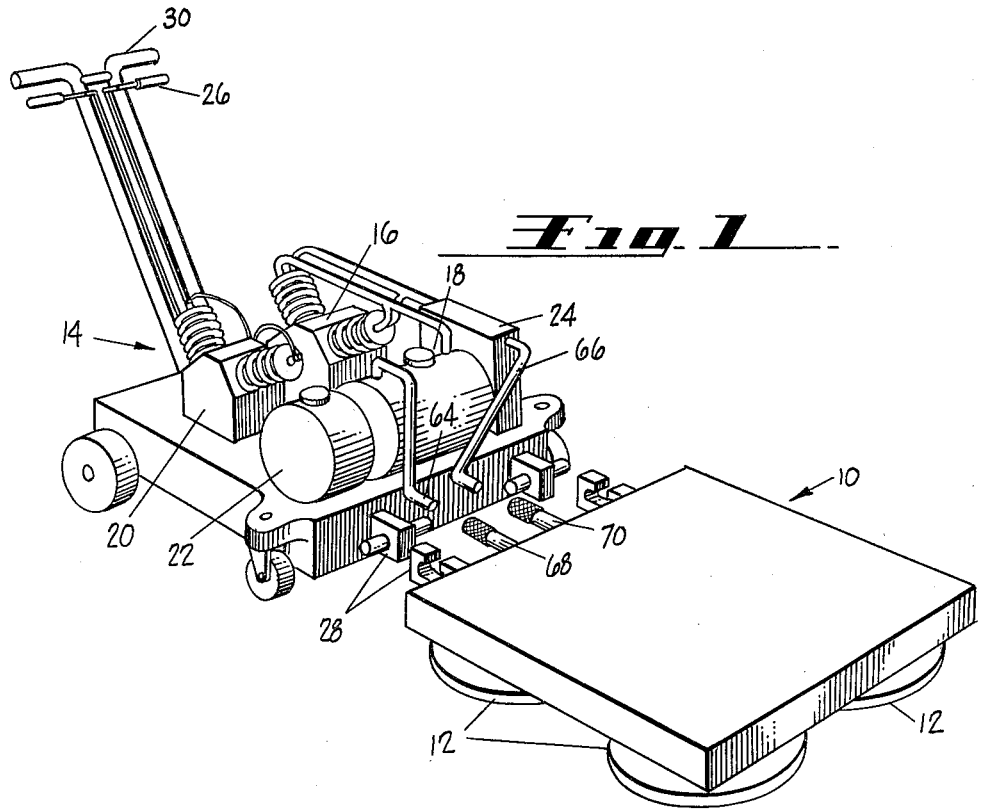
FIGURE 1 is a perspective view of a pallet embodying the present invention and shown adjacent to a hand truck carrying a source of pressurized air and a dust filtering unit.

In FIG. 1, pallet 10 is a hollow, rectangular platform reinforced with perforated cross members (not shown) and has ground engaging units or feet 12 at each of its corners. Pallet 10 may be moved by a unit, such as hand truck 14, which carries a source of compressed air, such as the compressor 16 and air tank 18, and a power source for the compressor, such as gasoline engine 20 and its associated gasoline tank 22. Hand truck 14 also carries a dust filtering unit 24 which is connected to the suction side of the compressor 16. The filtering unit employs conventional filter elements. Control means 26 are utilized to operate the power source, the compressed air source, and the filtering unit in known fashion. Hand truck 14 is connected to pallet 10 by latching means 28, and the attached units are moved about by manual pushing or pulling of handle 30 on the truck. Although movement of pallet 10 has been described above and will be described below in conjunction with a hand truck, it will be apparent to those skilled in the art that the pallet may also be moved by pushing on the load itself after it is secured to the pallet and after provision has been made for air and suction connections to the pallet from a stationary source.

With reference now to FIG. 3, the foot 12 is connected to pallet 10 by means of a hollow boss or post-like member 32 which rests within the pallet on circular flange 33. The boss is adapted for the introduction of pressurized air through central conduit 34 which extends below the pallet. The boss is open at the flanged connection and has a discharge opening 36 through which dust laden air can be drawn into the pallet and then into the filtering unit 24. Subtending central conduit 34 is a rigid, disc-like plate 38 and a resiliently yieldable member 40 attached by adhesive bonding to the plate. Member 40 is concave at its center, where it is secured to plate 38 by means of a flanged member 41 which also serves as the outlet port for the pressurized air. The orifice in member 41 is designed to provide the maximum rate of flow of the pressurized air desired in any particular application. Member 40 has a body consisting of sponge rubber, foamed polyurethane, or the like and a thin, abrasion-resistant skin 42 of rubber, plastic, nylon textile fabric, or the like, which rides over the ground plane 44. Enveloping plate 38 and member 40 is a hood 46 adapted to trap dust particles around the periphery of member 40 and provided with a central opening 48 which is in communication with the open end of boss 32.

Articulation of unit 12 with respect to pallet 10 is provided by the cooperating action of a downwardly concave, spheric flange or socket 50 at the mouth of conduit 34 and an upwardly convex, centrally perforate, spheric bearing plate 52. The latter plate rests in a central cylindrical recess 54 in plate 38 and is held in place by bolts 53 inserted in the flange of member 41. The central recess 54 is closed off at the top by means of a centrally apertured plate 56 attached to plate 38 and adapted to conform to spheric flange 50. Sufficient peripheral clearance between spheric flange 50 and recess 54 is provided so that a wide range of swivel movement in all directions in space is possible in coping with irregularities encountered in the ground plane. The feet may also be spun about the central vertical axis of the post-like member 32 by means of this articulation. Any upsetting tendency of the foot, such as may occur when the pallet is moved by pushing on the load directly, is avoided by having the pivot point 57 of the swivel joint coincide with the center of the lowermost surface of skin 42. This effectively eliminates the creation of a moment arm which would cause the leading edge of the foot to dig into the ground plane and the remainder of the foot to rise off the ground with consequent loss of the pressurized air.

To accommodate the previously described swivel movement of plate 38 and body 40, hood 46 also has an upwardly convex, spheric portion 58 which cooperates with a downwardly concave, centrally perforate member 60 attached to the underside of pallet 10. Sealing element 62 is interposed between portion 58 and member 60 to maintain a seal during swiveling and rotational movement of unit 12.

Figure 2:
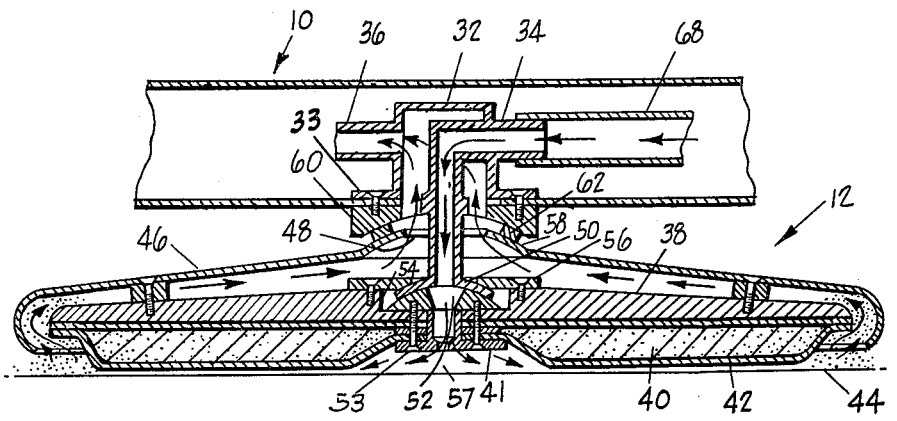
FIGURE 2 is a piping diagram for the pallet of FIG. 1, showing the piping arrangement for supplying pressurized air to the ground engaging units.

In use, pallet 10 is loaded to an extent which does not completely collapse or densify body 40 to a solid layer. After truck 14 is attached to the pallet by latching means 28, air pressure line 64 and suction line 66 on the truck are connected to their counterparts 68 and 70 on the pallet. When engine 20 and compressor 16 are actuated, air under pressure flows through lines 64 and 68 to each foot through the piping arrangement shown in FIG. 2. In each foot, air is directed into the central concavity in member 40, which initially amounts to a flexible plenum chamber. As the air pressure is built up in the chamber, it forces the walls of the chamber to flatten out somewhat and to move outwardly from the center. The air, now moving in a wedge-shaped front, then lifts the foot slightly off the ground plane as it escapes to the atmosphere. After startup, a continuous thin flotation film of air is provided between the skin 42 and the ground plane 44, over which the pallet can be moved with ease. The film is preferably 0.015 to 0.030 inch thick, but the invention is operable with both thinner and thicker layers. Air pressures ranging from two to forty pounds per square inch have been used, but pressures greater than these amounts may also be used. In this regard, the air pressure used must be greater than the unit loading on the pallet in order for the foot to be operable.

In the movement of the pallet, if a foreign object, such as a nailhead protruding slightly above the ground plane, should be encountered, flexible body 40 will yield locally but the remainder of the body will continue to hug the ground floor so that all of the air will not suddenly be permitted to escape and thereby destroy the lift imparted to the foot. If the nail should be protruding to such a height that the foot cannot go over it, it is also possible, upon contact of the foot with the nail, for the foot to be sufficiently spun about its pivot point to deflect the pallet away from the nail.

The use of discrete feet or ground engaging units at separate points on the pallet is particularly effective on undulating floors in maintaining the necessary proximity of their lowermost surface with the floor. If the lowermost surface were to be made coextensive with the pallet platform, there is a likelihood that the pallet would straddle two high portions of the floor, and all of the air would escape at the low portions. With discrete feet, however, one or more of them can be tilted to conform to the slope leading to the high portions of the floor while the rest of the feet remain substantially level or tilt in the opposite direction, depending upon the spacing between the high portions of the floor.

On floors where dust is a problem, suction lines 66 and 70 can be opened to suck up loose dust particles into the hood 46 and boss 32, and then discharged through opening 36. In the embodiment shown in FIGS. 1 to 3, the pallet platform itself, which is hollow, serves as the conduit member for the dust particles which eventually are removed in filtering unit 24. However, a separate piping arrangement similar to that shown in FIG. 2 for the pressurized air can be also provided to connect to suction outlet 70.

In the embodiment shown in FIG. 4, another foot 72 is shown attached to a base member 74 of a device such as a power machine, a tooling fixture, or other similar fixed load which requires frequent moving. Beyond a preferred minimum number of three, any number of additional feet 72 as may be necessary to support the load may be used. In this regard, care should be taken to avoid excessive loading on any foot which will densify body 73 to a solid layer. Foot 72 is essentially the same as foot 12 with some modification in the central columnar or post-like member 76. Member 76 and base member 74 are shown in engagement by means of a threaded connection 75 and an annular flange 77, although member 76 may also be welded or press fitted into the base member 74. A sleeve 78 with ports for pressure line 80 and suction line 82 is mounted at the upper end of member 76 and held in place by a nut 84. Member 76 is provided at the upper end with openings in registry with the ports in sleeve 78 and at the lower end with openings which communicate with the central opening 86 in the hood 88. Member 76 is also provided with a central conduit 90 for the pressurized air which fits concentrically into a hollow portion of member 76, thus providing separation of the pressurized air and the dust laden air. The remaining parts of foot 72 are the same as those of foot 12 and the method of use of foot 72 is the same as that of foot 12.

Although the devices of the present invention have been described above as being equipped with dust removal units, it will be obvious that these devices can be constructed without such units where dust is not a problem. Such a construction would call for the elimination of the hood and the provision of a central postlike member which has a single passageway for the pressurized air. The other constructional details will remain substantially the same as those previously described.

Although the presently preferred embodiments of the invention have been shown and described, it is to be understood that the invention is susceptible to variation in form and construction within the scope of the appended claims.

I claim:

1. A load supporting pallet comprising: a load carrying platform defining a vacuum chamber; a plurality of ground engaging units interposed between the platform and the ground plane; said units each having a hollow, postlike member extending substantially vertically into the platform, a discrete, rigid plate-like base member pivotally connected to the lower end of the postlike member for omnidirectional tilting, and a yieldable member united to the lower face of said plate-like member and having a lowermost, substantially centrally concave surface confronting the ground plane; means for supplying pressurized air to each of the ground engaging units for passage through the postlike member to the concavity in said yieldable member so as to maintain a film of pressurized air between said lowermost surface and the ground plane; and means surrounding the plate-like member of each of the ground engaging units and communicating with the vacuum chamber through the postlike member for removing dust particles raised from the ground plane by the pressurized air.

2. A load supporting device comprising: a load carrying member; a postlike member extending substantially vertically in relation to the load carrying member and having concentric passageways; a discrete, rigid plate-like base member pivotally connected to the lower end of the postlike member for omnidirectional tilting; a yieldable member united to the lower face of said plate-like member and having a lowermost, substantially centrally concave surface confronting the ground plane; means for supplying pressurized air through a first passageway in said postlike member to the concavity in said yieldable member so as to maintain a film of pressurized air between said lowermost surface and the ground plane; and suction means for removing, through a second passageway in said postlike member, dust particles raised from the ground plane by the pressurized air.

3. A load supporting device comprising: a load carrying member; a postlike member extending substantially vertically in relation to the load carrying member and having concentric passageways; a discrete, rigid plate-like base member pivotally connected to the lower end of the postlike member for omnidirectional tilting; a yieldable member united to the lower face of said plate-like member and having a lowermost, substantially centrally concave surface confronting the ground plane; means for supplying pressurized air through a first passageway in said postlike member to the concavity in said yieldable member so as to maintain a film of pressurized air between said lowermost surface and the ground plane; and suction means communicating with a second passageway in said postlike member for removing dust particles raised from the ground plane by the pressurized air, said means including a hood enveloping the base member and being pivotally connected to the postlike member for omnidirectional tilting in unison with the base member.

4. A load supporting device comprising: a load carrying member; a postlike member extending substantially vertically in relation to the load carrying member and having a downwardly opening spheric socket on its lower end; a separate, rigid plate-like member having in its median portion a spheric member complementary to the spheric socket and engaged in same; a yieldable member united to the lower face of said plate-like member and having a lowermost surface confronting the ground plane; concentric passageways in said postlike member; means for supplying pressurized air through a first passageway in said postlike member to the lowermost surface of the yieldable member so as to maintain a thin film of pressurized air between said surface and the ground plane; and suction means communicating with a second passageway in said postlike member for removing dust particles raised from the ground plane by the pressurized air; said suction means including a hood enveloping the plate-like member and having a centrally perforate, upwardly spheric portion, a bearing member concentrically disposed to the postlike member and having a downwardly opening spheric portion complementary to the spheric portion on the hood, and sealing means interposed between said spheric portions.

References Cited in the file of this patent

UNITED STATES PATENTS

| | | |
|---|---|---|
| 1,506,684 | Staples | Aug. 26, 1924 |
| 2,918,183 | Petersen et al. | Dec. 22, 1959 |

FOREIGN PATENTS

| | | |
|---|---|---|
| 306,533 | Great Britain | May 1, 1930 |

OTHER REFERENCES

"Iron Age," Apr. 3, 1958, pages 68 and 71.

"Remarks on the Ground-Effect Machine," by G. D. Boehler; presented Sept. 25, 1958, at the Fifth Annual Western Forum of the American Helicopter Society; page 2 and the pages containing Figures 1–4 relied on.